US011092217B2

(12) United States Patent
Cody

(10) Patent No.: US 11,092,217 B2
(45) Date of Patent: *Aug. 17, 2021

(54) BELT DRIVE SYSTEM

(71) Applicant: GATES CORPORATION, Denver, CO (US)

(72) Inventor: Michael Cody, Boulder, CO (US)

(73) Assignee: Gates Corporation, Denver, CO (US)

( * ) Notice: Subject to any disclaimer, the term of this patent is extended or adjusted under 35 U.S.C. 154(b) by 326 days.

This patent is subject to a terminal disclaimer.

(21) Appl. No.: 16/124,365

(22) Filed: Sep. 7, 2018

(65) Prior Publication Data

US 2019/0003559 A1    Jan. 3, 2019

Related U.S. Application Data

(62) Division of application No. 15/201,080, filed on Jul. 1, 2016, now Pat. No. 10,088,020.

(51) Int. Cl.
*F16H 7/18* (2006.01)
*B62M 9/06* (2006.01)
(Continued)

(52) U.S. Cl.
CPC .............. *F16H 7/18* (2013.01); *B62M 9/06* (2013.01); *F16H 7/023* (2013.01); *F16H 9/26* (2013.01);
(Continued)

(58) Field of Classification Search
CPC .......... F16G 1/28; F16H 7/023; F16H 55/171; Y10S 474/901
(Continued)

(56) References Cited

U.S. PATENT DOCUMENTS 2,412,114 A * 12/1946 Zonis ...................... F16H 7/023
474/88
2,770,977 A * 11/1956 Beckadolph ............ F16H 55/38
474/153
(Continued)

FOREIGN PATENT DOCUMENTS

DE    102010020527 A1    11/2011
DE    102012104846 A1    12/2013

OTHER PUBLICATIONS

Australian Government IP Australia, Examination Report No. 1 standard patent application, application No. 2018271340, dated Sep. 13, 2019.
(Continued)

*Primary Examiner* — Henry Y Liu
(74) *Attorney, Agent, or Firm* — Alyssa K. Sandrowitz, Esq.

(57) ABSTRACT

A belt drive system comprising a belt having a plurality of longitudinally spaced belt teeth, the belt further comprising a longitudinal groove extending in the endless direction of the belt through the belt teeth, a sprocket comprising a plurality of sprocket teeth on an outer circumference of the sprocket, each of the sprocket teeth extending parallel to the rotation axis, and each sprocket tooth configured to be received between adjacent belt teeth, and a first planar fin extending from at least one side of a sprocket tooth, the first planar fin configured to cooperatively engage the longitudinal groove, the first planar fin extending in a direction normal to a sprocket axis of rotation, the first planar fin having a width no greater than 20% of a sprocket groove width (W).

8 Claims, 4 Drawing Sheets

(51) Int. Cl.
  *F16H 7/02* (2006.01)
  *F16H 55/17* (2006.01)
  *F16H 9/26* (2006.01)
  *F16H 55/56* (2006.01)
  *B62M 9/00* (2006.01)
  *F16H 55/36* (2006.01)

(52) U.S. Cl.
  CPC ......... *F16H 55/171* (2013.01); *F16H 55/566* (2013.01); *B62M 2009/005* (2013.01); *B62M 2009/007* (2013.01); *F16H 2007/185* (2013.01); *F16H 2055/363* (2013.01)

(58) Field of Classification Search
  USPC .................................................. 474/152, 153
  See application file for complete search history.

(56) References Cited

U.S. PATENT DOCUMENTS

| | | | | |
|---|---|---|---|---|
| 3,026,737 | A * | 3/1962 | Berg | F16H 55/30 474/153 |
| 3,120,409 | A * | 2/1964 | Beall | B62D 55/12 305/179 |
| 3,156,126 | A * | 11/1964 | Olsen | F16H 7/023 474/153 |
| 3,338,107 | A * | 8/1967 | Kiekhaefer | F16H 7/023 474/153 |
| 3,436,801 | A * | 4/1969 | Berg | F16H 55/02 29/892.11 |
| 3,472,563 | A * | 10/1969 | Irgens | B62D 55/125 305/112 |
| 3,575,474 | A * | 4/1971 | Russ, Sr. | B62D 55/12 305/165 |
| 3,722,962 | A * | 3/1973 | Cooper | B62D 55/135 305/180 |
| 3,748,917 | A * | 7/1973 | Berg | F16G 13/02 474/62 |
| 3,821,906 | A * | 7/1974 | Berg | F16G 1/22 474/62 |
| 3,853,016 | A * | 12/1974 | Lane, III | A01D 57/06 198/698 |
| 3,854,272 | A * | 12/1974 | Lane, III | A01D 43/083 56/98 |
| 3,878,734 | A * | 4/1975 | Zeldman | F16G 1/28 474/205 |
| 3,888,132 | A * | 6/1975 | Russ, Sr. | F16G 1/28 474/153 |
| 4,027,587 | A * | 6/1977 | Tschinkel | B41J 1/20 101/111 |
| 4,072,062 | A * | 2/1978 | Morling | A01D 45/023 198/494 |
| 4,545,778 | A * | 10/1985 | Koivula | F16G 1/28 474/153 |
| 4,571,224 | A * | 2/1986 | Arinaga | F16H 7/023 474/153 |
| 4,573,953 | A * | 3/1986 | Tangorra | F16G 1/28 474/152 |
| 4,634,409 | A * | 1/1987 | Johnson | F16G 1/28 474/152 |
| 4,846,489 | A * | 7/1989 | Kleinebenne | B62K 3/06 280/261 |
| 4,846,771 | A * | 7/1989 | Kozachevsky | F16G 1/28 474/268 |
| 4,862,757 | A * | 9/1989 | Dahl | F16G 1/28 74/89.2 |
| 5,013,286 | A * | 5/1991 | Breher | F16G 1/28 474/153 |
| 5,230,665 | A * | 7/1993 | Tanaka | B64G 9/00 474/153 |
| 5,484,321 | A * | 1/1996 | Ishimoto | F16H 7/023 446/433 |
| 5,908,364 | A * | 6/1999 | Tanaka | F16H 7/06 474/148 |
| 6,099,427 | A * | 8/2000 | Brown | B65G 23/06 198/498 |
| 6,848,757 | B2 * | 2/2005 | Ueno | B62D 55/0885 305/115 |
| D544,894 | S | 6/2007 | Clarke | |
| D545,333 | S | 6/2007 | Clarke | |
| D592,107 | S | 5/2009 | Clarke | |
| 8,136,827 | B2 * | 3/2012 | Lumpkin | B62M 9/02 280/261 |
| 8,480,109 | B1 * | 7/2013 | Adams | B62M 9/02 280/261 |
| 8,979,689 | B2 * | 3/2015 | Dierl | F16H 55/171 474/153 |
| 9,222,568 | B2 * | 12/2015 | Schroedl | F16H 55/44 |
| 2013/0184110 | A1 * | 7/2013 | Reiter | F16H 55/30 474/152 |

OTHER PUBLICATIONS

European Patent Office, International Search Report application No. PCT/US2017/038795, dated Oct. 6, 2017.

* cited by examiner

BELT DRIVE SYSTEM

REFERENCE TO RELATED APPLICATIONS

This application is a divisional of and claims priority from U.S. non-provisional application Ser. No. 15/201,080 filed Jul. 1, 2016.

FIELD OF THE INVENTION

The invention relates to a belt drive system, and more particularly, to a belt drive system comprising a planar fin extending from one side of a sprocket tooth, the planar fin configured to cooperatively engage the longitudinal groove of a belt, the planar fin extending into a sprocket groove between adjacent sprocket teeth not greater than 50% of a groove width (W).

BACKGROUND OF THE INVENTION

The majority of motorcycles and bicycles utilize a drive train with a conventional chain transmitting power from a first pulley to a second pulley associated with a hub of a rear wheel. Chains are relatively effective at transmitting power between the first and second pulleys, but they are not without shortcomings. The shortcomings include the need for periodic lubrication, loss of efficiency as they wear, and chains can be noisy.

One known alternative to chain-based systems are belt drive systems. Belt drive systems overcome a number of the problems discussed above, but are not without their own problems. For example, belt drive systems generally require relatively precise alignment between first and second sprockets of the belt drive system. Providing such alignment can be difficult particularly in bicycles, where crank sets and hubs of various manufacturers can be mixed and matched in bicycle assembly, resulting in less than precise alignment. In addition, incidents may happen during use of the bike that degrades the sprocket alignment. One known way of addressing this misalignment is to provide radially extending side flanges on each sprocket to prevent the belt from wandering off the sprocket. However, such side flanges can complicate the manufacture of the sprocket, increase weight, and make the pulley wider, all of which can increase the cost of the sprocket. A further problem with known belt drive systems is collection of debris between teeth of the sprockets which can interfere with effective force transmission and, in extreme cases, cause a belt to break or jump off a sprocket.

Other systems are known which employ a single flange located in the center of the sprocket. The flange extends about the entire circumference. The cooperating belt comprises a central groove which the flange engages thereby ensuring proper alignment during operation. The flange extends between adjacent sprocket teeth. The flange prevents lateral movement and eventual disengagement of the belt from the sprocket. However, the central groove can accumulate debris which then interferes with operation. The flange also represents added weight for the sprocket.

Each of these disadvantages is significant for cycle applications and particularly bicycle applications.

Representative of the art is U.S. Pat. No. 8,136,827 which discloses a self-aligning belt drive system comprises a belt drive having a plurality of longitudinally spaced inner lobes each having an alignment groove. The system further comprises at least one pulley comprising a frame configured to rotate about a rotation axis and having a circular outer rim. A plurality of circumferential teeth extend radially and axially of the rim with each tooth being configured to be received between adjacent inner lugs of the drive belt. An alignment flange extends radially between circumferential teeth. The alignment flange is configured to be received in the alignment groove and the alignment flange extends no further radially from the rotational axis than the circumferential teeth. The circumferential teeth, the alignment flange and the alignment groove are configured so that with the alignment flange received in the alignment groove, the drive belt rides on the circumferential teeth.

What is needed is a sprocket having a planar fin extending from one side of a sprocket tooth, the planar fin configured to engage the longitudinal belt groove, the planar fin extending into a sprocket groove between adjacent sprocket teeth not greater than 20% of a groove width (W). The present invention meets this need.

SUMMARY OF THE INVENTION

The primary aspect of the invention is a sprocket having a planar fin extending from one side of a sprocket tooth, the planar fin configured to engage the longitudinal belt groove, the planar fin extending into a sprocket groove between adjacent sprocket teeth not greater than 20% of a groove width (W).

Other aspects of the invention will be pointed out or made obvious by the following description of the invention and the accompanying drawings.

The invention comprises a belt drive system comprising a belt having a plurality of longitudinally spaced belt teeth, the belt further comprising a longitudinal groove extending in the endless direction of the belt through the belt teeth, a sprocket comprising a plurality of sprocket teeth on an outer circumference of the sprocket, each of the sprocket teeth extending parallel to the rotation axis, and each sprocket tooth configured to be received between adjacent belt teeth, and a first planar fin extending from at least one side of a sprocket tooth, the first planar fin configured to cooperatively engage the longitudinal groove, the first planar fin extending in a direction normal to a sprocket axis of rotation, the first planar fin having a width no greater than 20% of a sprocket groove width (W).

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
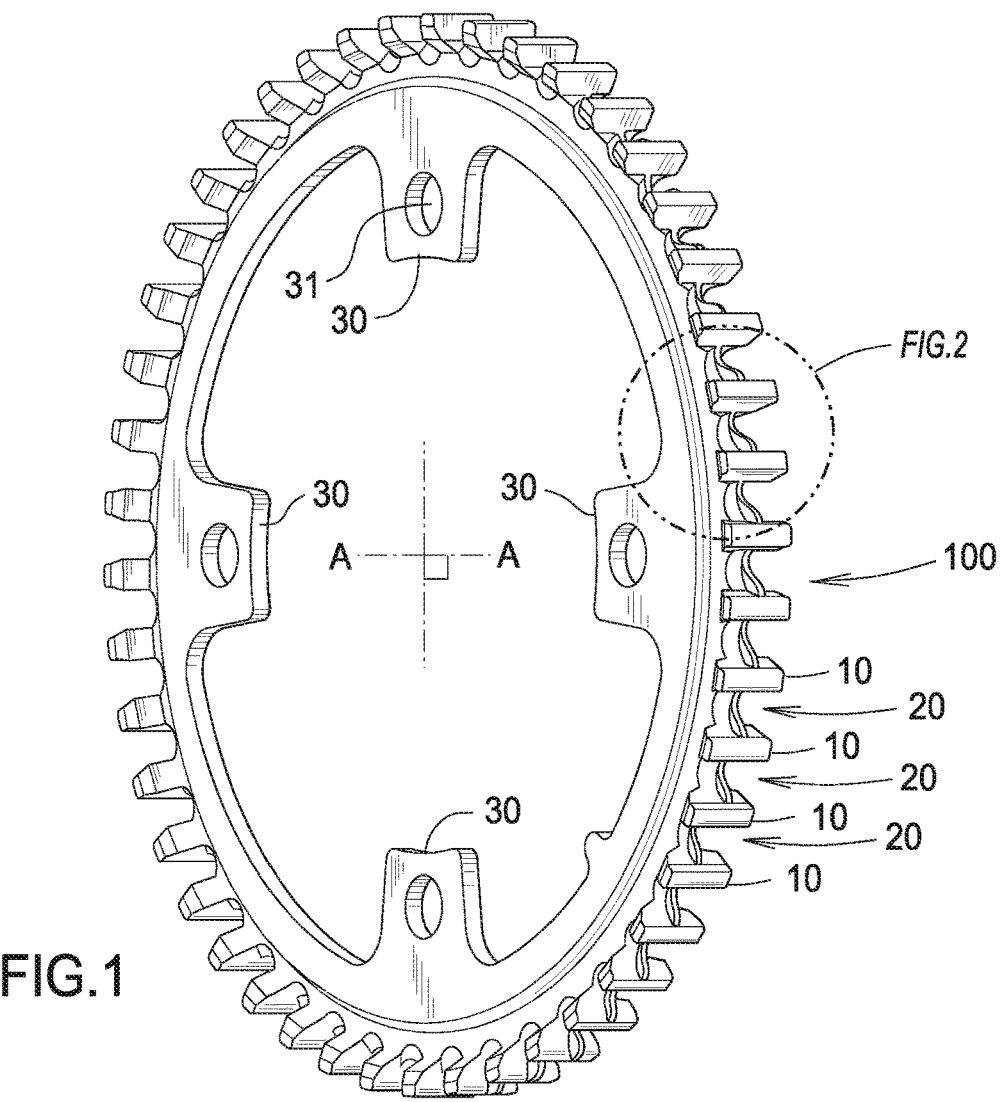
FIG. 1 is a perspective view of a sprocket.

FIG. 1 is a perspective view of a sprocket. Sprocket 100 comprises teeth 10 which are disposed about an outer circumference of the circular sprocket. Each tooth 10 extends transverse to the direction of rotation, or put another way, parallel to the axis of rotation of the sprocket.

Members 30 allow sprocket 100 to be mounted to a crankset, such as for a bicycle. A fastener (not shown) engages hole 31 whereby the sprocket is fixed to a crankset, see FIG. 7.

A groove 20 is disposed between each set of adjacent teeth 10. Each groove 20 cooperatively engages a tooth 52 on a drive belt, see FIG. 5.

A fin 40 projects from one side of a tooth 10 in a direction normal to the axis of rotation (A-A) of the sprocket. Each fin is substantially planar and each engages a longitudinal groove in the drive belt, see FIG. 5. Engagement between each fin and the longitudinal groove serves to align the belt with the sprocket during operation. Fin 40 may also simply comprise a bead or protrusion, either of which projects above the surface of the tooth. Fin 40 only need project enough to control lateral movement of the belt on the sprocket during operation. For example, the fin projection may extend approximately 1 mm from the tooth surface.

The number of fins used on a sprocket may vary from one fin per sprocket tooth, to a spacing wherein only two fins are engaged with the belt for a given belt wrap angle θ. For example, if the belt wrap angle is 180° then the system would comprise at least two fins for every 180° of circumference. If the belt wrap angle is 160° then the system would comprise at least two fins for every 160° of circumference and so on. The configuration of fins may comprise every other tooth, or every third tooth, or fourth tooth and so on to a minimum of two fins for a given belt wrap angle.

Figure 2:
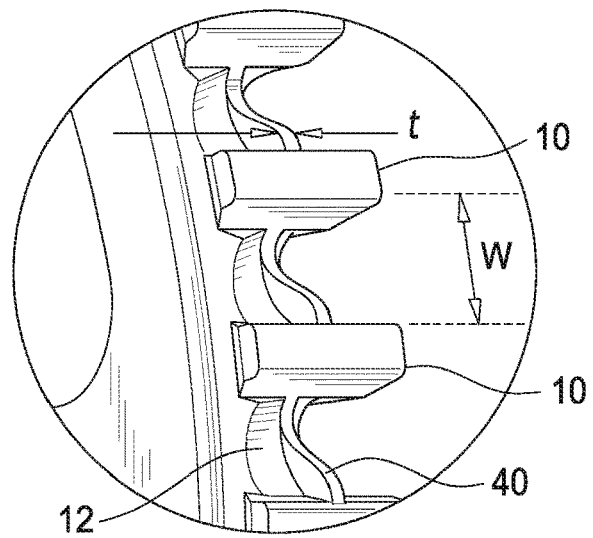
FIG. 2 is a detail of FIG. 1.

FIG. 2 is a detail of FIG. 1. Each tooth 10 comprises a fin 40 that extends in a sprocket tangential direction from one side of each sprocket tooth. Each fin engages with the belt longitudinal groove as the belt contacts the sprocket during operation. Even though the size of the fin is relatively small compared to a groove width (W), it is sufficient for proper belt alignment and belt engagement on the sprocket. This is due in part to the relatively high lateral stiffness of the drive belt over the short distances between adjacent teeth and the relatively low lateral force exerted on the belt in a misalignment condition. The minimal size of each fin reduces overall weight of the sprocket over the prior art and also decreases the opportunity for any debris lodged in the longitudinal groove to disrupt operation of the system by possibly disengaging the belt from the sprocket.

The groove width (W) is measured at the widest point at the top of the groove immediately below the tooth shoulders 11.

A sprocket land portion 21 between each tooth comprises a chamfered portion 12 to facilitate ejection of debris that may become entrained with the belt. The chamfered portion may be on each side of the teeth 10 or limited to just one side.

Figure 8:
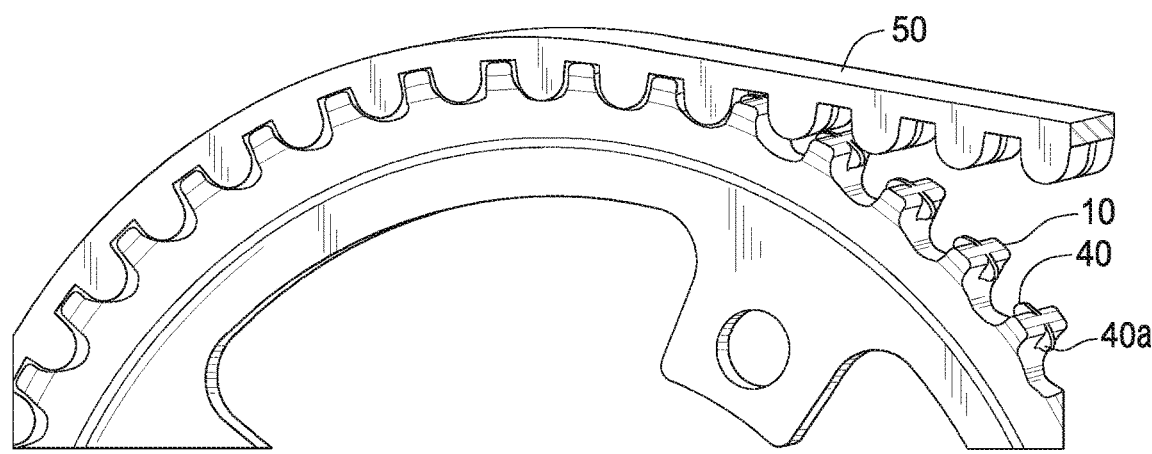
FIG. 8 is a perspective view of an alternate embodiment.

In an alternate embodiment a second planar fin extends from each tooth on a side opposite the first planar fin, see FIG. 8.

Figure 3:
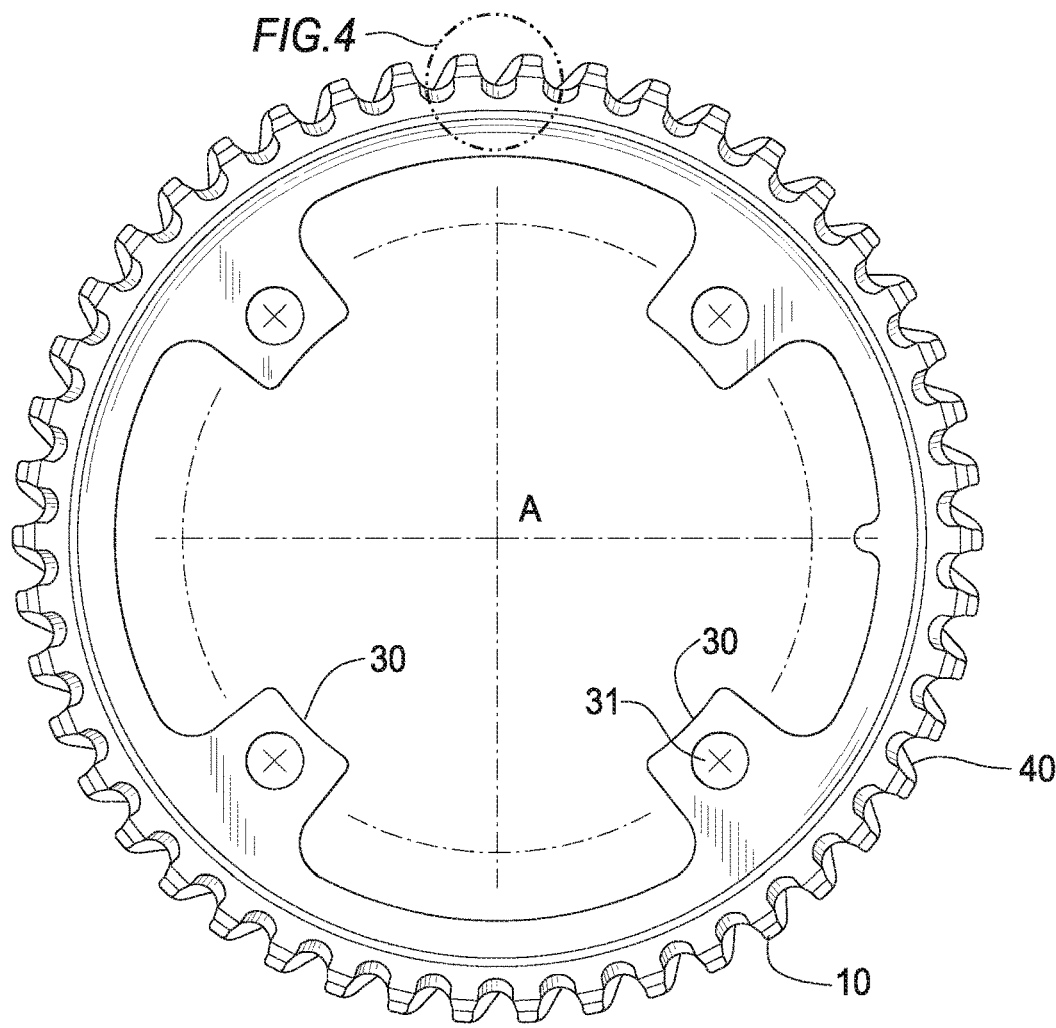
FIG. 3 is a side view of a sprocket.

FIG. 3 is a side view of a sprocket. Sprocket 100 has an axis of rotation A-A. Fasteners (not shown) can be used through holes 31 to attach the sprocket to a crankset, see FIG. 7.

Figure 4:
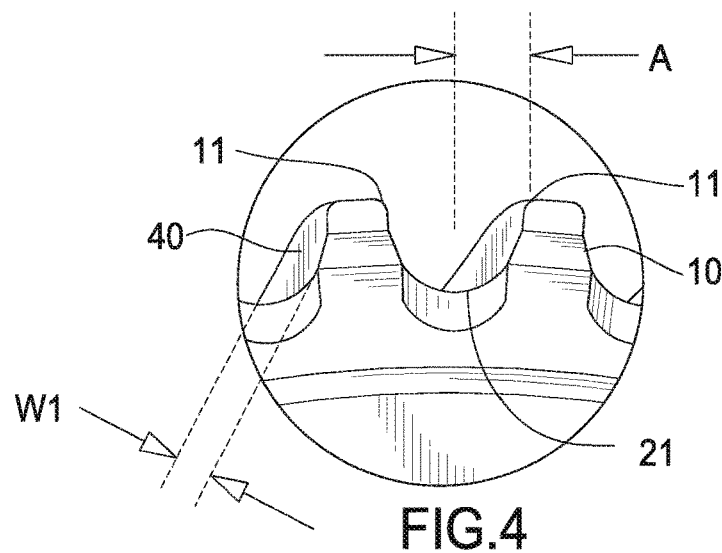
FIG. 4 is a detail of FIG. 3.

FIG. 4 is a detail of FIG. 3. Each fin 40 is disposed on one side of a tooth. Each fin radially extends from a tooth shoulder 11 to a groove land 21. The width of each fin (w1) is in the range of approximately 20% to less than 50% of the total groove width (W) when measured at the fin's point of greatest width. Each fin has a substantially constant width (w1) along its length, with the exception of where each end tapers to the shoulder 11 and land 21. Of course, the width of each fin may vary somewhat along its length depending upon the tooth profile to which it is attached.

Each fin 40 engages land 21 at a point (A) that is no greater than 50% of the width (W) of groove 20 from the tooth to which it is attached. The thickness (t) of each fin is less than the width of the cooperating longitudinal groove in the belt.

Each fin may be located on the tooth leading side relative to the direction of rotation, or on the trailing side relative to the direction of rotation. Each fin is disposed in the center of each tooth to align with the longitudinal groove which is typically disposed in the center of the belt. However, the longitudinal groove and fins may be laterally offset from a centerline to one side or the other of the tooth in order to accommodate differing design requirements.

The inventive belt drive system can be used on bicycles. The system is used on the crankset and a driven wheel, typically a rear wheel. The belt system can also be used on motorcycles or on any system which makes use of a toothed belt drive, such as industrial and agricultural equipment, vehicles, scooters, mowers, combines, pumps and so on.

Figure 5:
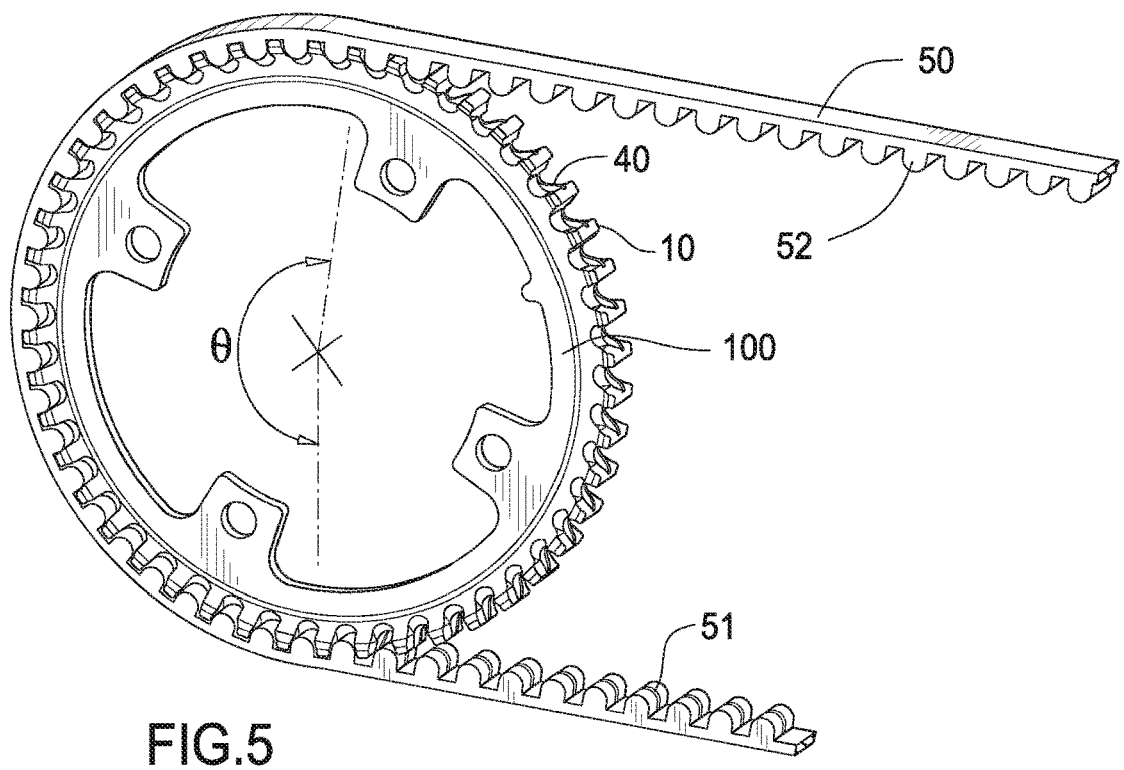
FIG. 5 is perspective view of the system.

FIG. 5 is perspective view of the system. A belt 50 is trained between a sprocket 100 and a sprocket 60. Belt 50 comprises a longitudinal groove 51 and a plurality of teeth 52. Groove 51 extends in the endless direction through all teeth 52 of the belt. Groove 51 has a groove depth (D). Each tooth 52 is transverse to the belt endless direction. Each tooth 52 engages a sprocket groove 20. Longitudinal groove 51 extends along a centerline of the belt, but in alternate embodiments may be disposed to one side or the other of the centerline of the belt.

The belt wrap angle θ is approximately 180° for the embodiment in FIG. 5. The belt wrap angle is the angle through which the belt engages the sprocket. The minimum number of planar fins for this belt wrap angle is two. The sprocket may also comprise a planar fin 40 on every tooth 10 as well.

Figure 6:
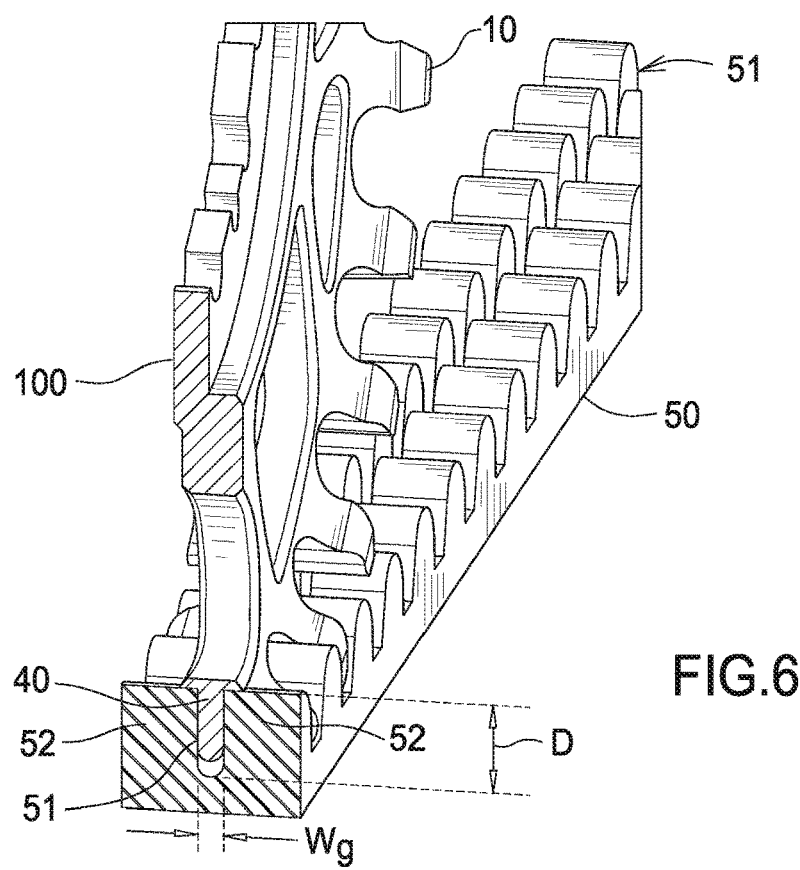
FIG. 6 is a cross sectional view of the system.

FIG. 6 is a cross sectional view of the system. Each planar fin 40 engages groove 51. Groove 51 cuts through teeth 52 in the belt endless direction. Each fin 40 has a thickness (t) less than the width (Wg) of groove 51. Each fin 40 is aligned with a midpoint of each tooth 52, or in an alternate embodiment can be offset to one side of each tooth 52. Width (Wg) of groove 51 is less than 20% of the belt width, although any width up to approximately 75% of the belt width may be selected. An exemplary belt width is in the range of 11 mm to 25 mm, however, there is no upper limit on belt width.

Figure 7:
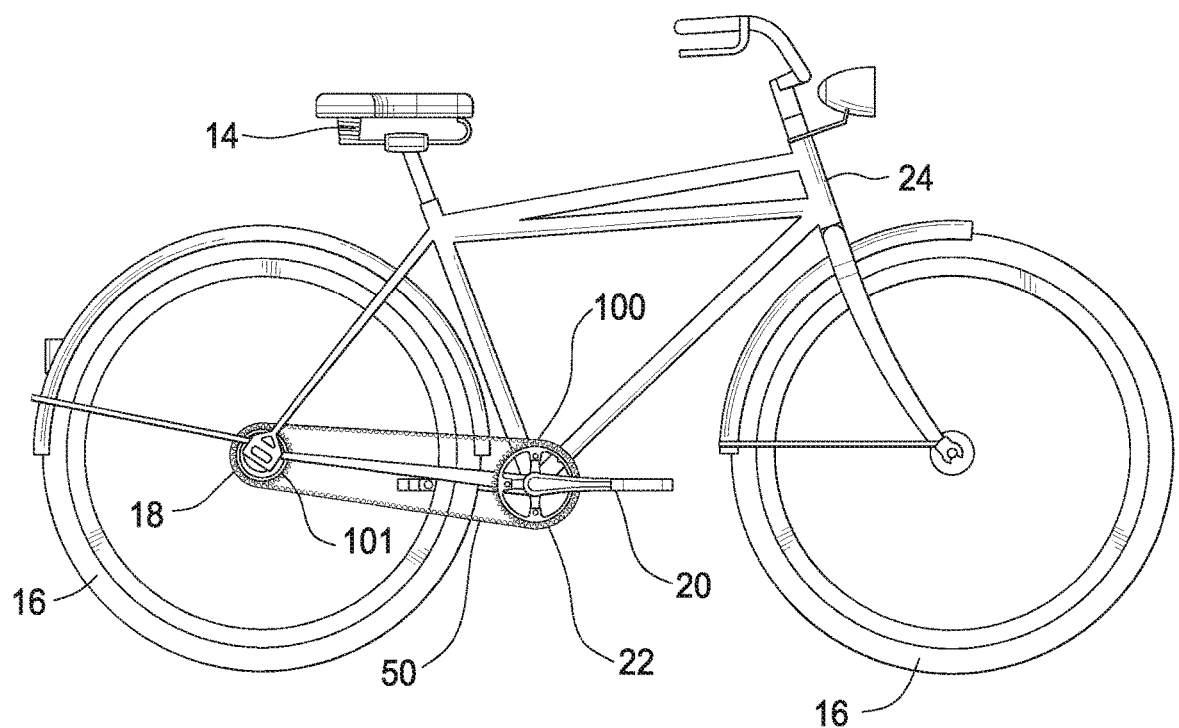
FIG. 7 is a bicycle with the inventive system.

FIG. 7 is a bicycle with the inventive system. A bicycle comprises among other components a frame 24, wheels 16 and a seat 14. The inventive system 12 comprises a crank 20 with sprocket 100 mounted thereto, and rear sprocket 101 attached to the rear wheel 16 which is in turn journalled to frame 24. Belt 50 is trained between sprocket 100 and sprocket 101. Crank 22 comprises pedals for use by a rider. A rear wheel hub may comprise a multi-gear arrangement or a single speed hub.

FIG. 8 is a perspective view of an alternate embodiment. This embodiment comprises a first planar fin 40 and second planar fin 40a on opposing sides of each tooth 10. In this configuration each second planar fin 40a opposes a first planar fin 40. Each first planar fin and each second planar fin cooperatively engages the longitudinal groove. Each second planar fin 40a extends in a direction normal to a sprocket axis of rotation. Each second planar fin 40a having a width (w1) in a range of approximately 20% to no greater than 50% of a sprocket groove width (W).

The numerical values in this specification are offered as examples and are not intended to limit the breadth or scope of the invention.

Although a form of the invention has been described herein, it will be obvious to those skilled in the art that variations may be made in the construction and relation of parts without departing from the spirit and scope of the invention described herein.

I claim:

1. A belt drive system comprising:
   a belt having a plurality of longitudinally spaced belt teeth, the belt further comprising a longitudinal groove extending in the endless direction of the belt through the belt teeth;
   a sprocket comprising a plurality of sprocket teeth on an outer circumference of the sprocket, each of the sprocket teeth extending parallel to the rotation axis, and each sprocket tooth configured to be received between adjacent belt teeth; and
   a first planar fin extending from at least one side of a sprocket tooth, the first planar fin configured to cooperatively engage the longitudinal groove, the first planar fin extending in a direction normal to a sprocket axis of rotation, the first planar fin having a width less than or equal to 50% of a sprocket groove width (W).

2. The belt drive system as in claim 1, wherein the first planar fin is centered on each sprocket tooth.

3. The belt drive system as in claim 1, wherein the sprocket comprises no more than three first planar fins to engage the belt.

4. The belt drive system as in claim 1, wherein the longitudinal groove extends along a belt centerline.

5. The belt drive system as in claim 1, wherein the sprocket comprises at least two first planar fins within a belt wrap angle θ.

6. The belt drive system as in claim 1 further comprising:
   a second planar fin extending from the sprocket tooth opposite the first planar fin, the second planar fin configured to engage the longitudinal groove; and
   the second planar fin having a width less than or equal to 50% of a sprocket groove width (W).

7. A belt drive system comprising:
   a belt having a plurality of longitudinally spaced belt teeth, the belt further comprising a longitudinal groove extending in the endless direction of the belt through the belt teeth;
   a sprocket comprising a plurality of sprocket teeth on an outer circumference of the sprocket, each of the sprocket teeth extending parallel to the rotation axis, and each of the sprocket teeth being configured to be received between adjacent belt teeth; and
   a protrusion centered on each sprocket tooth and extending from one side of each sprocket tooth, the protrusion configured to cooperatively engage the longitudinal groove, the protrusion extending in a direction normal to a sprocket axis of rotation, but not engaging an adjacent sprocket tooth.

8. A bicycle comprising:
   a crank;
   a rear wheel;
   a sprocket and belt system operatively associated with the crank and rear wheel, the sprocket and belt system comprising:
   a belt having a plurality of longitudinally spaced belt teeth, the belt further comprising a longitudinal groove extending in the endless direction of the belt through the belt teeth;
   a first sprocket mounted to the crank comprising a plurality of first sprocket teeth on an outer circumference of the first sprocket, each of the first sprocket teeth extending parallel to the rotation axis, and each of the first sprocket teeth being configured to be received between adjacent belt teeth;
   a second sprocket mounted to the rear wheel comprising a plurality of second sprocket teeth on an outer circumference of the second sprocket, each of the second sprocket teeth extending parallel to the rotation axis, and each of the second sprocket teeth being configured to be received between adjacent belt teeth; and
   a planar fin centered on a first sprocket tooth and a second sprocket tooth, each planar fin extending from one side of each first sprocket tooth and one side of each second sprocket tooth, each planar fin configured to cooperatively engage the longitudinal groove, each planar fin extending in a direction normal to a first sprocket axis of rotation less than 50% of a sprocket groove width (W) between adjacent sprocket teeth.

* * * * *